United States Patent Office 3,632,564
Patented Jan. 4, 1972

---

3,632,564
PROCESS FOR INHIBITING POPCORN
POLYMER FORMATION
Harry Elmer Albert and Paul Gordon Haines, Lafayette
Hill, Pa. (both of 900 1st Ave., King of Prussia, Pa.
19406)
No Drawing. Original application Nov. 7, 1967, Ser. No.
681,093. Divided and this application July 8, 1970, Ser.
No. 61,006
Int. Cl. C08d 5/00, 3/04, 3/06
U.S. Cl. 260—94.7 N                      7 Claims

ABSTRACT OF THE DISCLOSURE

Process of retarding the formation of popcorn polymers by use of an aromatic amine oxide of structure

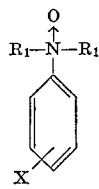

where $R_1$ is lower alkyl, hydroxy substituted lower alkyl, or a group of structure

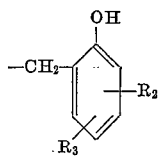

where $R_2$ is hydrogen or lower alkyl, and $R_3$ is a tertiary alkyl group, X is hydrogen, halogen, nitro, or lower alkyl, and with the proviso that the total number of carbon atoms in the $R_1$ groups be at least four.

---

This application is a divisional of S.N. 681,093, filed Nov. 7, 1967.

In the preparation of synthetic rubber from such intermediates as styrene and butadiene (e.g., SBR elastomers) undesirable spontaneous polymerization often occurs in the recovery systems for the olefinically unsaturated monomers. Polymerization may occur to form either a clear, solid, aromatic solvent soluble polymer or to form an entirely different cross-linked insoluble polymer, known, because of its appearance, as popcorn polymer. While both types of this self-polymerization are objectionable, the popcorn polymer, which is predominantly formed, is particularly undesirable because it is self-propagating in the presence of the monomer vapor or liquid and not only rapidly fouls the equipment, but is very difficult to remove and control. When such popcorn polymers do form it frequently becomes necessary to disassemble the equipment and mechanically remove the accumulations of unwanted polymer.

Much work has been done to find suitable inhibitors to prevent popcorn polymer formation. Nitrites and nitroso compounds have been found to be effective as have $NO_2$, $N_2O_3$, certain phenolic compounds, sulfur and some aromatic amines. However, each of these agents leaves something to be desired for commercially effective use. Some of the agents are difficult to handle; others introduce colored impurities into the recovered olefins; some, although having the desired properties, are too expensive to be of commercial utility.

Because of the uniqueness of the popcorn polymer, and the manner in which it is formed, there is no correlation between popcorn polymer inhibition and monomer stabilization which involves the prevention of premature polymerization of olefins during shipping or storage. Thus, for example, it is disclosed in U.S. 2,667,442 that amine oxides such as dimethylaniline oxide are useful to prevent the premature polymerization of styrene. However, dimethylaniline oxide is not effective as a popcorn polymer inhibitor. This is consistent with disclosures of various other agents reported to be stabilizers for olefinic monomers which are not effective as popcorn polymer inhibitors.

It has now been found by means of this invention that effective inhibition of popcorn polymer formation can be achieved by the use of a compound of structure

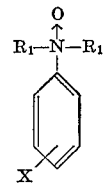

where $R_1$ is lower alkyl, hydroxy substituted lower alkyl, or a group of structure

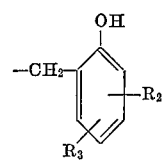

where $R_2$ is hydrogen or lower alkyl, and $R_3$ is a tertiary alkyl group, X is hydrogen, halogen, nitro, or lower alkyl, and with the proviso that the total number of carbon atoms in the $R_1$ groups be at least four.

In the above structural formula "lower alkyl" refers to those alkyl groups containing 1 to 4 carbon atoms and the term "tertiary alkyl group" refers to groups such as butyl, amyl, hexyl, octyl, and like groups which are attached to the aromatic ring by means of a tertiary carbon atom. As also indicated, the total number of carbon atoms in the $R_1$ groups must exceed four and this will exclude from the invention compounds such as dimethylaniline-N-oxide and methylethylaniline-N-oxide. Specific compounds falling within the above description of operable compounds are:

diethylaniline-N-oxide,
o-nitro-diethylaniline-N-oxide,
p-nitrodiethylaniline-N-oxide,
o-chlorodiethylaniline-N-oxide,
p-bromodipropylaniline-N-oxide,
o-iododibutylaniline-N-oxide,
o-methyldiethylaniline-N-oxide,
2,2'-(phenylimino)diethanol-N-oxide,
4,4'-(phenylimino)dibutanol-N-oxide,
N-methyl-N-(2-hydroxy-3-t-butyl-5-methylbenzyl)aniline-N-oxide,
N-methyl-N-(2-hydroxy-5-t-amylbenzyl)aniline-N-oxide, and the like.

All of the above compounds except diethylaniline-N-oxide are novel compounds and are an embodiment of this invention. Thus the generic configuration of these novel compounds is as given above by the structural formula except that X in the structure is other than hydrogen. These novel compounds are readily made from the corresponding amine by oxidation with hydrogen peroxide as shown in the subsequent examples.

As already indicated, in the manufacture of synthetic rubber the problem of popcorn polymer formation is pecular to the monomer recovery system where the monomers are recovered by distillation. The conventional closed system for the emulsion polymerization of butadiene with styrene comprises a conventional reaction vessel equipped with a stirring mechanism and necessary heating or cooling means in which the monomers are caused to polymerize. After a suitable degree of polymerization is achieved, the polymerization reaction is stopped by the addition of a suitable stopping agent. The resulting polymer latex is then allowed to flow into a flash tank which is at or slightly above atmospheric pressure and at which time most of the residual butadiene is removed from the latex. The gaseous butadiene is then removed from the flash tank and liquified for reuse. The butadiene degassed latex is then allowed to flow into a conventional vacuum flash tank where further butadiene and other dissolved gaseous materials are removed. The vacuum flash tank is maintained at a temperature of about 100° F. It is in this vacuum flash tank that the most ideal conditions for popcorn polymer formation exist because the tank is at the proper temperature; the atmosphere above the level of latex contained in the tank contains about 2% or less of butadiene; and a certain amount of catalyst has vaporized and collected on the inner exposed metal surfaces of the tank above the level of the latex. These conditions will initiate popcorn polymer. The popcorn polymer will continue to grow as long at it is fed by a new supply of latex containing a small proportion of butadiene and other polymerizable monomer, such as styrene. The pipe lines leading to and from this vacuum flash tank are also ideal areas for popcorn polymer formation.

The latex is then pumped from the vacuum flash tank to a conventional styrene stripping column where the latex is passed counter-current to a rising stream of steam causing the styrene to be removed from the latex where it is then recirculated in a conventional manner to the reaction vessel for polymerization with butadiene. In the styrene stripping column popcorn polymer formation also tends to develop unless some precautions are taken to prevent its development.

Preferably, the inhibitor is added to a flash tank used in the recovery process. However, the inhibitor may be introduced to the monomer at any stage in the manufacture of synthetic rubber, as for example during the manufacture, handling, storage, etc. of the intermediates. For example, the inhibitor vapor can be introduced as the gaseous monomer is being passed through pipes, it can be mixed with the monomer in process tanks, or, as indicated, it can be introduced during the fractional distillation of materials in the recovery systems of the rubber manufacturing process. In the preferred technique it is considered best to feed the monomer into a flash tank or fractional distillation column of conventional type. The monomer is subject to fractional distillation using conventional reboiling at the bottom of the column and withdrawal of overhead material at the top, condensing the overhead material and returning a portion of it to the top of the column as reflux. The inhibiting vapor or solution is continuously fed, preferably by spraying its solution in water or monomer into the upper portion of the column through which it descends. In other techniques the inhibitor can be introduced to one or more of the monomers in any phase wherein the monomer is being circulated in the process.

The concentration at which the inhibitor is used will usually range from 0.001 to about 5.0 percent by weight of the total monomers (i.e. about 10 to 50,000 parts per million parts of monomer). At concentration below this value the inhibiting effects are to small to be of significant value. On the other hand, greater amounts may be used, say up to 20%, but such large amounts are not required and are simply wasteful of inhibitor.

It is to be understood that the amine oxide inhibitors may be used generally to prevent popcorn polymers in the preparation of polymers and copolymers such as those obtained from ethylenically unsaturated monomers. For homopolymers, the unsaturated monomer will be a conjugated diolefin. The useful conjugated diolefins are exemplified by butadiene such as butadiene-1,3, isoprene, cyanobutadiene-1,3, chloroprene, 2-phenylbutadiene, 2,3-dimethylbutadiene-1,3, and the like. The copolymerizable monomer used in copolymer formation and which will normally comprise up to about 70% of the mixture will be a mono-olefin containing a single $CH_2=CH-$ group having at least one of the free valence bonds attached to an electronegative group. Such olefins include aromatic olefins such as styrene, vinylnaphthaline, α-methylstyrene, p-chlorostyrene, etc.; the carboxy containing monomers and the corresponding esters, nitriles, and amides such as acrylic acid, methacrylic acid, methyl methacrylate, acrylonitrile, methacrylamide, and the like. Preferably, this invention will be used in recovering the monomers used to make any butadiene-based polymer latex.

In order to illustrate the effectiveness of the invention, the following examples are given:

EXAMPLES (A) Preparation of active compounds (1) Preparation of o-nitrodiethylaniline-N-oxide.—A solution of 7.8 g. (0.04 mole) of o-nitrodiethylaniline in 40 ml. of 98% formic acid was heated to 55–60° C. and then 19.1 g. (0.186 mole) of 35% hydrogen peroxide was adde dropwise during stirring. The resulting reaction mixture was heated at 55–60° C. with stirring for 2 hours. The cooled reaction mixture was diluted with 50 ml. of water and then it was neutralized with concentrated ammonium hydroxide. This solution was extracted once with ether and the ether extract was discarded. The product was extracted with seven 30 ml. portions of chloroform. Evaporation of the chloroform solution gave 3.8 g. (45% conversion) of crude product, M.P. 80–90° C.

After recrystallization from acetone-hexane the melting point of the tan solid obtained was 90–93° C.

Analysis (percent): N=13.18. Calc'd (percent): N=13.35. The structure of the product was confirmed by infrared absorption analysis.

(2) Preparation of p - chloro - N,N-diethylaniline-N-oxide(monohydrate).—A solution of 11.0 g. (0.06 mole) of p-chlorodiethylaniline in 60 ml. of 98% formic acid was heated to 55–60° C. and then 28.7 g. (0.294 mole) of 35% hydrogen peroxide was added dropwise during stirring. The reaction mixture was heated at 55–60° C. with stirring for 2 hrs. The cooled reaction mixture was diluted with 70 ml. of water and neutralized with concentrated ammonium hydroxide. This was extracted with seven 30 ml. portions of chloroform. Evaporation of the solvent gave 15 g. of a residue which was recrystallized from acetone-hexane to give 8.0 g. (61.3% conversion) of a white solid having a melting point of 79–81° C. A small portion of this solid recrystallized from acetone had a melting point of 82–84° C.

Analysis (percent): C, 55.26; H, 7.44; N, 6.52. Calculated (percent): C, 55.2; H, 7.34; N, 6.44. The structure of the product was confirmed by infrared absorption analysis.

(3) N - methyl - N(2 - hydroxy - 3-t-butyl-5-methylbenzyl)aniline-N-oxide.—The present amine was prepared by the following sequence of reactions described in U.S. 3,219,700:

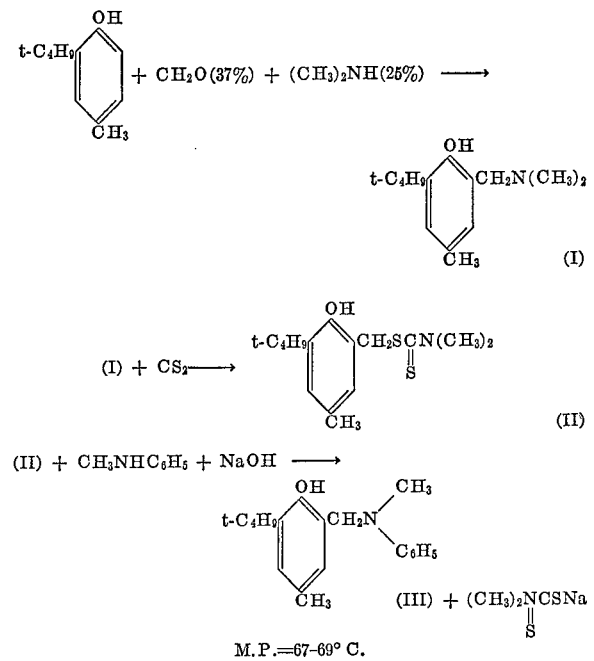

M.P.=67–69° C.

To a solution of 14.1 g. (0.05 mole) of (III) in 50 ml. of boiling methanol, 9.7 g. (0.1 mole) of 35% H₂O₂ was added. The reaction mixture was refluxed 3 days and at the end of this period no peroxide remained (iodometric titration). The solvent was removed in a flash evaporater at 55–60° C. under reduced pressure. The residue, a dark brown viscous oil weighed 14.7 g. (98.3% yield).

Analysis (percent): C, 77.56; H, 8.57; N, 4.20. Calculated (percent): C, 76.4; H, 8.36; N, 4.68. The structure of the product was confirmed by infrared absorption analysis.

(4) N - ethyl - N-(2-hydroxy-5-t-amylbenzyl)aniline-N-oxide (dihydrate).—The parent amine was prepared by the following sequence of reaction:

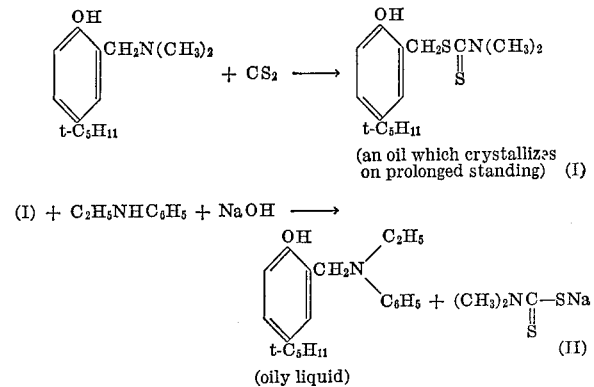

A solution of 29.7 g. (.01 mole) of (II) in 4.0 ml. methanol was treated with 19.4 g. (0.2 mole) 35% H₂O₂. The reaction mixture was refluxed 5½ hrs. Titration showed no peroxide to be present. The solvent was removed in a flash evaporator at 55–60° C. under reduced pressure to give 33.0 g. (94.5% yield) of a dark brown viscous oil.

Analysis (percent): C, 69.74; H, 8.77; N, 3.94. Calculated (percent): C, 69.0; H, 8.91; N, 4.03. The structure of this product was confirmed by infrared absorption analysis.

(B) Evaluation techniques

Procedures used for evaluating a compound as an inhibitor for popcorn polymer in the liquid phase involved flushing 7 oz. beverage bottles with nitrogen, then charging each bottle with 30 ml. of inhibitor-free styrene, 0.5 g. of popcorn polymer seed and the material to be tested as the popcorn inhibitor. The "seed," from plant flash tanks, was activated just before usage by overnight exposure to a 100 watt incandescent lamp. The bottles were capped and 1 ml. of liquid butadiene was injected into each bottle with a hypodermic syringe through the self-sealing NBR synthetic rubber cap liner. The bottles were then placed in a constant temperature oven at 60° C. and were inspected periodically for the appearance of popcorn polymer. After popcorn growth started in each bottle it often proceeded rapidly, filling most of the free space in the bottle with white insoluble polymer having the appearance of popcorn. The time required for initiation of popcorn growth and the rate of growth depend somewhat on the activity of the "seed" used. Such "seed" usually becomes less active on standing. The inhibitors of this invention were found to affect both the time required for the initiation of popcorn growth and the rate of growth. In some cases the growth proceeded to a low conversion and stopped, the inhibitor preventing complete conversion to popcorn polymer. In the presentation of data, the time for initiation of popcorn polymer growth is given.

The following Table I indicates the results of the test technique.

TABLE I

Evaluation of aromatic amine oxides as popcorn polymer inhibitors

| Compound tested at 0.1% concentration: | Time in days for start of popcorn polymer growth at 60° C. |
|---|---|
| Blank | 1 |
| Diethylethanolamine oxide | 2 |
| Pyridine oxide | 1 |
| Dimethylaniline N-oxide | 1 |
| p-Nitrodimethylaniline N-oxide | 1 |
| Diethylaniline oxide | 7 |
| o-Nitrodiethylaniline N-oxide | 15 |
| p-Chloro-N,N-diethylaniline N-oxide | 9 |
| 2,2'-(phenylimino)diethanol N-oxide | 9 |
| N - methyl - N - (2-hydroxy-3-t-butyl-5-methyl benzyl)-aniline N-oxide | 9 |
| N - ethyl - N-(2-hydroxy-5-t-amylbenzyl)-aniline N-oxide | 10 |

It will be understood that the above description and examples are merely illustrative and that numerous changes and variations may be made without departing from the spirit or scope of the invention.

We claim:
1. The process of retarding the formation of popcorn polymers in monomer recovery systems in the preparation of synthetic rubber from conjugated diolefin-containing monomer systems which comprises contacting said monomer with an inhibiting amount of a compound having the structure.

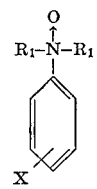

wherein R₁ is lower alkyl, hydroxy substituted lower alkyl, or a group of structure

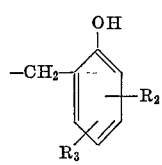

where R₂ is hydrogen or lower alkyl, R₃ is a tertiary alkyl group, X is hydrogen, halogen, nitro, or lower alkyl, and with the proviso that the total number of carbon atoms in the $R_1$ groups be at least four.

2. The process of claim 1, where the active agent is diethylaniline oxide.

3. The process of claim 1, where the active agent is o-nitrodiethylaniline-N-oxide.

4. The process of claim 1, where the active agent is p-chloro-N,N-diethylaniline-N-oxide.

5. The process of claim 1, where the active agent is 2,2′-(phenylimino)diethanol-N-oxide.

6. The process of claim 1, where the active agent is N - methyl - N-(2-hydroxy-3-t-butyl-5-methylbenzyl)aniline-N-oxide.

7. The process of claim 1, where the active agent is N - ethyl - N-(2-hydroxy-5-t-amylbenzyl)aniline-N-oxide.

References Cited

UNITED STATES PATENTS

| 3,518,320 | 6/1970 | Albert | 260—666.5 |
| 3,524,894 | 8/1970 | Albert | 260—666.5 |
| 3,575,912 | 4/1971 | Albert | 260—29.7 |

JOSEPH L. SCHOFER, Primary Examiner

W. F. HAMROCK, Assistant Examiner

U.S. Cl. X.R.

260—29.7, 85.1, 666.5, 923, 88.7 B, 93.5 A, 83.3, 83.5